United States Patent
Gottschlag et al.

(10) Patent No.: US 10,877,648 B2
(45) Date of Patent: Dec. 29, 2020

(54) CLIENT DEVICE, MONITORING SYSTEM, METHOD FOR DISPLAYING IMAGES ON A SCREEN AND COMPUTER PROGRAM

(71) Applicant: Robert Bosch GmbH, Stuttgart (DE)

(72) Inventors: Daniel Gottschlag, Nuremberg (DE); Stephan Heigl, Hannover (DE)

(73) Assignee: ROBERT BOSCH GMBH, Stuttgart (DE)

( * ) Notice: Subject to any disclaimer, the term of this patent is extended or adjusted under 35 U.S.C. 154(b) by 786 days.

(21) Appl. No.: 14/429,376

(22) PCT Filed: Sep. 17, 2013

(86) PCT No.: PCT/EP2013/069254
§ 371 (c)(1),
(2) Date: Mar. 19, 2015

(87) PCT Pub. No.: WO2014/044668
PCT Pub. Date: Mar. 27, 2014

(65) Prior Publication Data
US 2015/0248220 A1 Sep. 3, 2015

(30) Foreign Application Priority Data
Sep. 24, 2012 (DE) .......... 10 2012 217 151

(51) Int. Cl.
*G06F 3/14* (2006.01)
*G06F 3/0488* (2013.01)
(Continued)

(52) U.S. Cl.
CPC ........ *G06F 3/04845* (2013.01); *G06F 3/0488* (2013.01); *H04N 7/18* (2013.01);
(Continued)

(58) Field of Classification Search
CPC ..................................... G06F 3/14; G06F 3/17
(Continued)

(56) References Cited

U.S. PATENT DOCUMENTS

2003/0156303 A1* 8/2003 Schnee ............... G06K 9/2009
358/509
2003/0214578 A1 11/2003 Luehwink et al.
(Continued)

FOREIGN PATENT DOCUMENTS

| DE | 10222203 | 12/2003 |
|---|---|---|
| WO | 0169911 | 9/2001 |
| WO | 0233976 | 4/2002 |

OTHER PUBLICATIONS

International Search Report for Application No. PCT/EP2013/069254 dated Dec. 12, 2013 (English Translation, 2 pages).

*Primary Examiner* — Ruay Ho
(74) *Attorney, Agent, or Firm* — Michael Best & Friedrich LLP

(57) ABSTRACT

The invention proposes a client device (2) having a screen (5), having a display device (6) for displaying a first image representation on said screen (5), wherein said first image representation shows an actual image section (9) in an actual selected range (10) from an image coordinate system $P_x$, $P_y$. The client device also has a selection device (7) which is designed to select a desired selected range (11) from the image coordinate system $P_x$, $P_y$, and a communications device (8) which is designed to request and receive a desired image section (12) of the desired selected range (11). The display device (6) is designed to display, in a second image representation, the actual image section (9) correctly in terms of position and size in the desired selected range (11) and, in an additional image representation, to display the desired image section (12) correctly in terms of position and size in the desired selected range (11), the actual image (Continued)

section (9) and the desired image section (12) coming from different images of an image sequence.

19 Claims, 5 Drawing Sheets

(51) Int. Cl.
    *G06F 3/0484*     (2013.01)
    *H04N 7/18*     (2006.01)
    *H04N 21/485*     (2011.01)
    *H04N 21/2187*     (2011.01)
    *H04N 21/414*     (2011.01)
    *H04N 21/4223*     (2011.01)

(52) U.S. Cl.
    CPC ... *H04N 21/2187* (2013.01); *H04N 21/41407* (2013.01); *H04N 21/4223* (2013.01); *H04N 21/485* (2013.01)

(58) Field of Classification Search
    USPC .......... 715/716; 358/1.9, 509; 382/100, 107; 348/229.1, 36; 345/419; 455/566
    See application file for complete search history.

(56) References Cited

U.S. PATENT DOCUMENTS

| | | | |
|---|---|---|---|
| 2007/0195345 A1* | 8/2007 | Martinez | H04N 1/6011 358/1.9 |
| 2008/0060011 A1 | 3/2008 | Kelts | |
| 2008/0123897 A1* | 5/2008 | Cho | G06F 3/0481 382/100 |
| 2010/0173678 A1* | 7/2010 | Kim | H04N 5/23216 455/566 |
| 2011/0085016 A1 | 4/2011 | Kirstiansen et al. | |
| 2011/0286635 A1* | 11/2011 | Nishigaki | G06T 7/248 382/107 |
| 2012/0249830 A1* | 10/2012 | Tsubaki | G06T 5/008 348/229.1 |
| 2013/0342526 A1* | 12/2013 | Ng | G06T 15/205 345/419 |
| 2014/0368608 A1* | 12/2014 | Ishida | H04N 5/225 348/36 |

\* cited by examiner

CLIENT DEVICE, MONITORING SYSTEM, METHOD FOR DISPLAYING IMAGES ON A SCREEN AND COMPUTER PROGRAM

BACKGROUND OF THE INVENTION

The invention relates to a client device having a screen, having a display device for displaying a first image display on the screen, the first image display showing an ACTUAL image section in an ACTUAL selection area from an image coordinate system, having a selection device, the selection device being designed to select a DESIRED selection area from the image coordinate system, and having a communication device, the communication device being designed to request and receive a DESIRED image section of the DESIRED selection area, the display device being designed to display the ACTUAL image section in a second image display in the correct position and at the correct size in the DESIRED selection area, and to display the DESIRED image section in a further image display in the correct position and at the correct size in the DESIRED selection area. The invention also relates to a monitoring system having the client device, a method having the client device and a computer program.

The monitoring of public or private places, buildings, rooms and the like by monitoring cameras is widespread today. The monitoring cameras are, for example, designed as a rigid video camera which is focused on a region of space or the like, or as a controllable PTZ (pan/tilt/zoom) video camera. In order to view the video recordings effected by means of the monitoring camera, said recordings are usually reproduced on a terminal having a screen.

By way of example, DE 102 22 203 A1, which is probably the closest prior art, describes an image monitoring system having an image generator, an evaluation unit and a display. Also present is an input means which is manually movable and therefore suitable for inputting drawings and selecting menu items in a user guide. A context-sensitive aid can be formed on the display when work is performed with the image monitoring system.

SUMMARY OF THE INVENTION

According to the invention, a client device having a screen and having a display device is proposed, the display device being designed to display a first image display on the screen. The first image display displays an ACTUAL image section in an ACTUAL selection area from an image coordinate system for an image. The ACTUAL image section therefore shows a subarea of the image formed in the image coordinate system, the subarea of the ACTUAL image section being determined by the ACTUAL selection area arranged in the image coordinate system. In particular, the image coordinate system comprises the total size of the image recorded by a device. The image coordinate system is particularly preferably a pixel coordinate system with an image resolution of, for example, 1920×1080 P.

The client device comprises a selection device, the selection device being designed to select a DESIRED selection area from the image coordinate system. The DESIRED selection area arranged in the image coordinate system determines a DESIRED image section, the DESIRED image section showing a subarea of the image formed in the image coordinate system. In particular, the DESIRED image section is shifted and/or scaled in relation to the ACTUAL image section, in particular enlarged or reduced. The selection of the DESIRED selection area is performed via a manual command input. In particular, the selection of the DESIRED selection area is exactly one command input starting from the ACTUAL selection area.

The client device comprises a communication device, the communication device being designed to request and receive the DESIRED image section of the DESIRED selection area. The request output by the communication device comprises, in particular, data relating to the DESIRED selection area in the image coordinate system. The data transmission of the request and the reception of the DESIRED image section is preferably performed via a network. The network can be a closed-circuit network such as, for example, a LAN or a wireless network such as, for example, a WLAN. However, it is also possible for the network, or at least a subsection of the transmission path in the network, to be designed as a public network, in particular an internet.

The display device is designed to display the ACTUAL image section in a second image display at least partially in the correct position and at the correct size in the DESIRED selection area, and to display the DESIRED image section in a further image display in the correct position and at the correct size in the DESIRED selection area. In the second image display, the DESIRED image section thus displays at least one subsection of the ACTUAL image section. For the position-correct and size-correct display of the subsection in the DESIRED selection area, said subsection is preferably formed in accordance with the shifting and/or scaling of the ACTUAL selection area in relation to the DESIRED selection area. In particular, the subsection forms at least one section of an overlapping area of the ACTUAL image section and the DESIRED image section.

It is proposed within the scope of the invention that the ACTUAL image section and the DESIRED image section originate from different images of an image sequence. In particular, a moving image or a sequence of different images is to be understood as the image sequence. The different images can preferably be individual images as a continuous image sequence in a specific time interval of the image sequence. The images of the image sequence preferably define the image coordinate system. It is particularly preferred for the image sequence to be acquired by at least one monitoring camera.

One advantage of the invention is the possibility of being able to select a DESIRED image section from the image sequence. This permits the user to select and to view not only the total size of the image sequence, but equally subareas. This ensures that image sections of the image sequence are clearly displayed. A further advantage results from the interim display of the selected position and size of the subsection of the ACTUAL image section in the DESIRED selection area as far as the display of the DESIRED image section. On the one hand, this means that during the second image display the user is already given a display of the shifting and/or scaling of the subsection such that he/she is immediately able to detect the process of his/her selected DESIRED image section. On the other hand, the interim display of the subsection always supplies the user with an image to be viewed, so that, starting from the selection of the DESIRED image section as far as the display of the DESIRED image section, the latency is bridged for the user. The bridging of the latency turns out to be advisable, particularly in the case of large data volumes of the image sequence and/or in the case of a low bandwidth network. A steady, rapid implementation of the command input is shown to the user in this way.

In a preferred embodiment, the display device is designed to display an INTERMEDIATE image section at least partially in the correct position and at the correct size in the DESIRED selection area in the case of at least one intermediate image display upstream of the further image display. The INTERMEDIATE image section forms at least partially an image section which is updated and/or supplemented in relation to the ACTUAL image section. In particular, the subsection of the INTERMEDIATE image section, which is to be displayed in the DESIRED selection area, forms the updated and/or supplemented image section. The ACTUAL image section and the at least one INTERMEDIATE image section therefore originate from different images of the image sequence. Furthermore, the at least one INTERMEDIATE image section and the DESIRED image section respectively originate from different images of the image sequence. The ACTUAL, the at least one INTERMEDIATE and the DESIRED image sections are therefore respectively assigned an image of the image sequence. The at least one intermediate image display is preferably at least one automated display.

In one possible implementation of the invention, the position-correct and size-correct display of the DESIRED image section is controlled in the DESIRED selection area by means of metadata. The metadata are data relating to the position of the images, in particular the ACTUAL image section, the INTERMEDIATE image section and/or the DESIRED image section, in the image coordinate system. The communication device is preferably designed to receive the metadata in common with the DESIRED image section. The display device is, in particular, designed to process the metadata received by the communication device in order to display the DESIRED image section on the screen. In order to shift the ACTUAL selection area to the DESIRED selection area, in the case of a preferred embodiment of the invention, the selection device is designed to reposition the selection of the DESIRED selection area by an interactive shift of a selected pixel of the ACTUAL image section, the ACTUAL image section being shifted in common with the selected pixel in order to display the ACTUAL image section at least partially in the DESIRED selection area. It therefore follows that in the case of the interactive shifting there is a relative shift of the ACTUAL selection area in relation to the DESIRED selection area in the image coordinate system.

In order to scale the ACTUAL selection area, in the case of an alternative or optional supplementation, the selection device is designed to reposition the selection of the DESIRED selection area by an interactive shift of two selected pixels of the ACTUAL image section, the ACTUAL image section being scaled as a function of the position of the two selected pixels in order to display the ACTUAL image section at least partially in the DESIRED image section. In the case of the interactive shifting of the two selected pixels, there is therefore an at least partial enlargement or reduction of the ACTUAL image section. In the case of an enlargement of the distance of the two selected pixels, there is preferably a partial enlargement of the ACTUAL image section. In the case of a reduction in the distance of the two selected pixels, there is preferably a partial reduction of the ACTUAL image section. In the case of the partial enlargement of the ACTUAL image section, in relation to the ACTUAL selection area the DESIRED selection area shows a smaller image section from the image coordinate system. The one or two selected pixels therefore form the command transmitter for determining the DESIRED selection area.

For the interactive shifting, the selection device is, for example, designed as a mouse, a keyboard or a trackball. It is particularly preferred to design the selection device as a touchscreen. In the case of or during the shifting of the selected pixel or of the selected pixels, said pixel or said pixels is/are always arranged at the positioned site, for example of the mouse pointer on the screen, particularly preferably of the finger or fingers on the touchscreen. The touchscreen can in this case be integrated in the client device; in particular, the screen is fitted with the touchscreen. The selection of the one pixel or the two pixels is performed, for example, by a single or multiple touching movement of the touchscreen. The command input for selecting the DESIRED selection area starting from the ACTUAL selection area is preferably performed by precisely one touching movement of the touchscreen.

A preferred design implementation of the invention provides that the client device is designed as a mobile receiving unit, in particular as a tablet or as a cell phone. Tablets and cell phones are mostly intuitively operable for a user and therefore facilitate the selection of the DESIRED image section.

A further subject matter of the invention relates to a monitoring system having a client device according to the preceding description. The monitoring system serves for monitoring a room, building, public place or the like. The monitoring system preferably comprises at least one server which has the image sequence and is designed to output the DESIRED image section to the communication device. The server is, for example, a video memory. In particular, the server is designed to receive the request of the communication device. The received request is evaluated by the server, whereupon the DESIRED image section of the DESIRED selection area is output to the communication device in common with metadata which specify, in particular, the image coordinate points of the DESIRED image section. Formulated in more general terms, each image section is transmitted to the client device by the server in common with metadata which are assigned to the image section, the metadata comprising the position of the assigned image section in the image coordinate system.

In a preferred embodiment, the server is assigned to at least one or exactly one, two, three or a plurality of monitoring cameras which respectively acquire an image sequence. This configuration has the advantage of also being able to monitor a plurality of rooms, buildings, places and the like. If the server is assigned at least two monitoring cameras, it is preferably possible to switch over to one of the cameras via the client device so that there is a switchover to another image sequence.

The image sequence is, for example, designed as a stored video recording, but preferably as a live picture which is acquired by the one monitoring camera or by one of the monitoring cameras. The live picture is a real-time image of the monitoring camera.

A further subject matter of the invention relates to a method for operating a client device or the monitoring system, in which an ACTUAL image section is displayed in an ACTUAL selection area on a screen in a first image display, in which a DESIRED selection area is subsequently selected, and in which the ACTUAL image section is subsequently displayed at least partially in a second image display, and a DESIRED image section of the DESIRED selection area is displayed in the correct position and at the correct size in the DESIRED selection area in the further image display. In particular, the client device is designed as described before. Specifically, the method is designed for the previously described mode of operation of the client device.

A further subject matter of the invention relates to a computer program having program code means in order to carry out all the steps of said method when the program is executed on a computer and/or the client device.

BRIEF DESCRIPTION OF THE DRAWINGS

Further features, advantages and effects of the invention emerge from the following description of preferred exemplary embodiments of the invention, in which.

DETAILED DESCRIPTION

Figure 1:
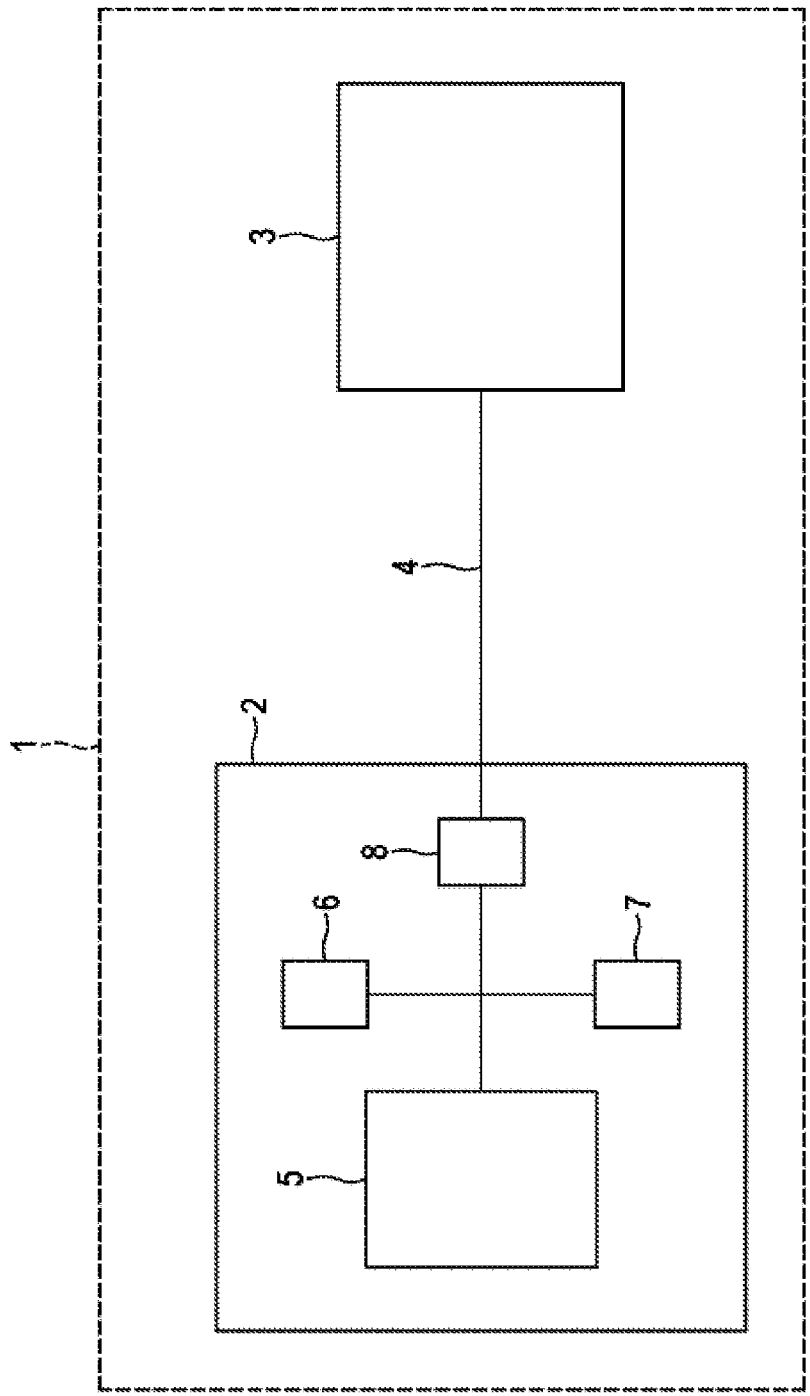
FIG. 1 shows a schematic block diagram of a monitoring system with a client device as an exemplary embodiment of the invention.

FIG. 1 shows a schematic block diagram of a monitoring system 1 which can be designed to monitor any desired monitoring area. The monitoring of a conference etc. can also be concerned. However, it is particularly preferred to use the monitoring system 1 to monitor monitoring areas against unauthorized intrusion, theft, in particular shoplifting etc.

The monitoring system 1 comprises one or more client devices 2 and one or more servers 3. The server 3 is connected to the client device 2 via a network 4. The network 4 is, for example, a public network, in particular an internet.

The server 3 includes at least one image sequence relating to the monitoring area, the at least one image sequence being acquired by at least one monitoring camera. In order to view the at least one image sequence, the latter is transmitted from the server 3 to the client device 2 via the network 4.

The client device 2 can be designed as a personal computer, but it is preferably designed as a mobile terminal, in particular as a cell phone or a tablet.

The client device 2 has a screen 5 for displaying the image sequence. The screen 5 is controlled by a display device 6, the display device 6 being able at the same time to be the control device of the client device 2. Furthermore, the client device 2 includes a selection device 7 which forms a man-machine interface to the client device 2, and is designed, for example, as a touch-sensitive zone on the screen 5 so that it is implemented as a touchscreen. Furthermore, the client device 2 has a communication device 8 which is designed to communicate with the server 3 via the network 4, as is still to be described below.

Figure 2:
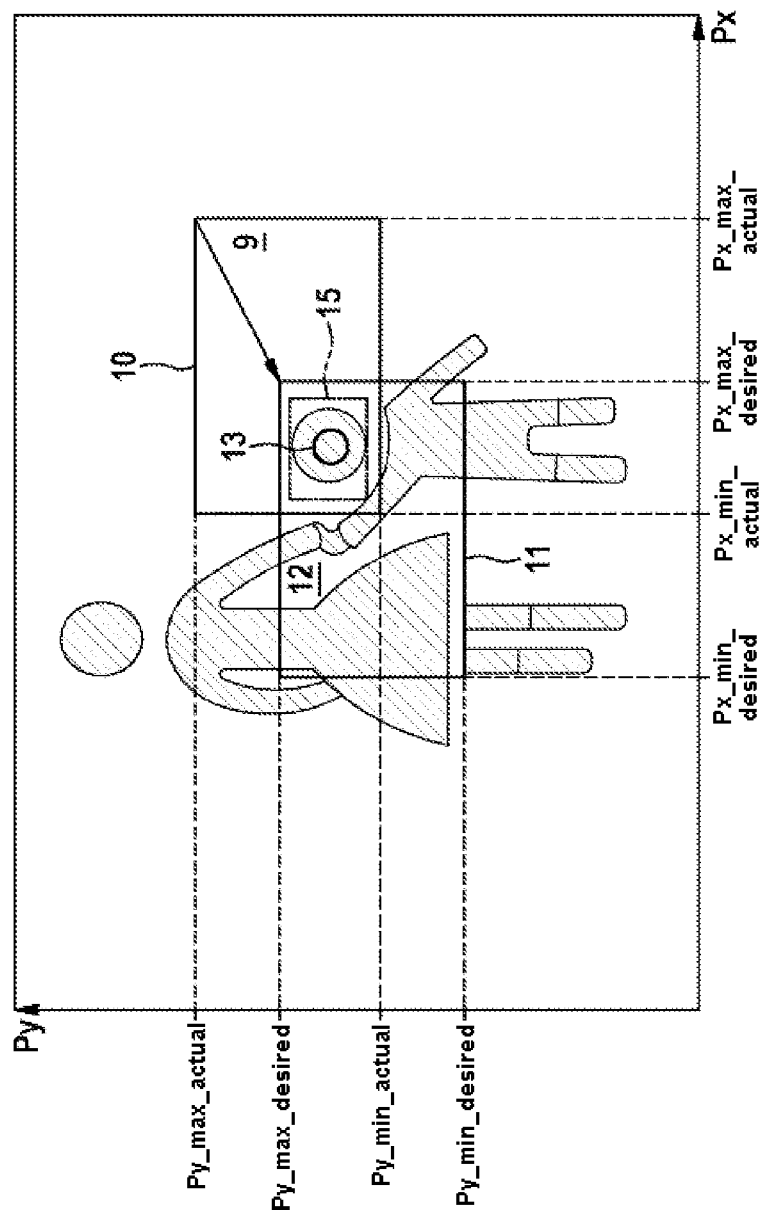
FIGS. 2 and 3 respectively show a schematic representation illustrating the mode of operation of the monitoring system from FIG. 1.

The mode of operation of the monitoring system 1 is to be explained with the aid of FIG. 2. The figure shows an image, acquired by the monitoring camera, of the image sequence which is defined by an image coordinate system $P_x$, $P_y$. The image coordinate system $P_x$, $P_y$ is applied as a pixel coordinate system with axes in pixels, and the image is formed with an image resolution of 1920×1080, for example.

The client device 2 is designed to display a first image display on the screen 5. The first image display shows an ACTUAL image section 9 in an ACTUAL selection area 10 from the image coordinate system $P_x$, $P_y$. The ACTUAL image section 9 is a subarea of the acquired image of the image sequence, the ACTUAL image section 9 being determined by the arrangement and size of the ACTUAL selection area 10 in the image coordinate system $P_x$, $P_y$.

Figure 3:
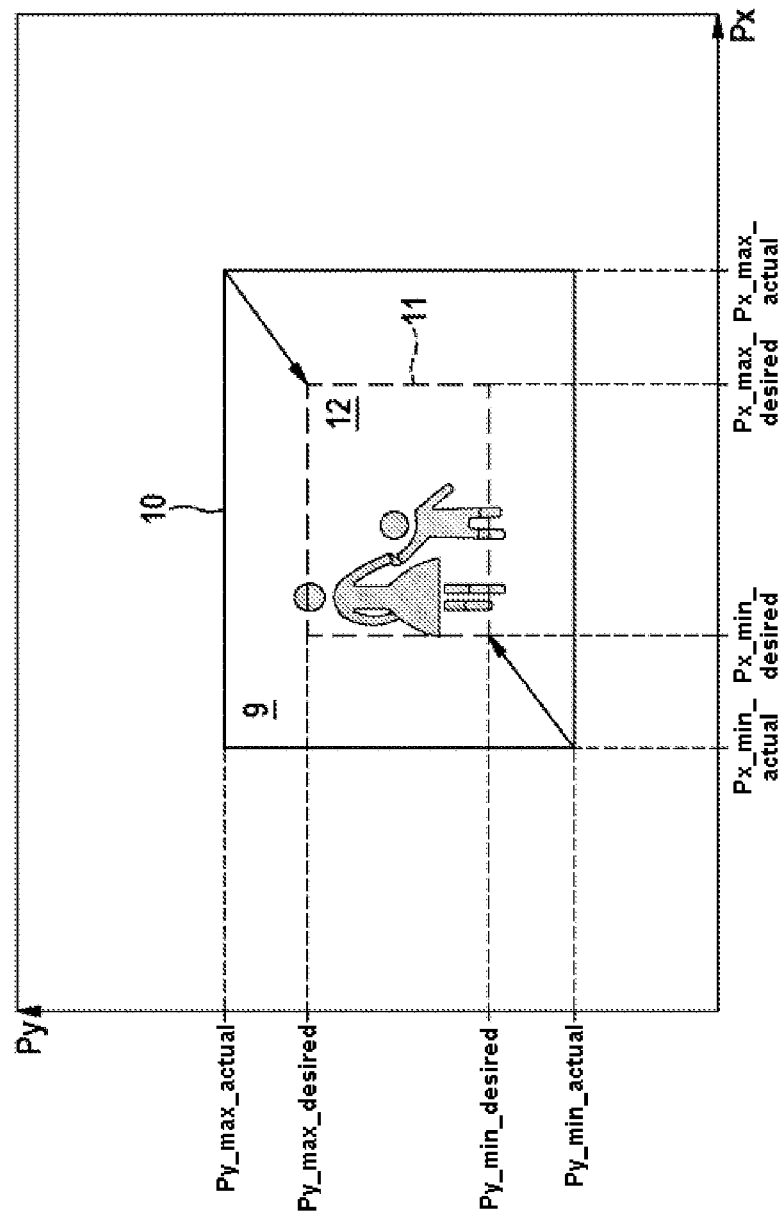

Via the selection device 7, the user is enabled to select a DESIRED selection area 11 for a further image display. In the DESIRED selection area 11, a DESIRED image section 12 is displayed in a further image display in the correct position and at the correct size. Depending on the selection of the user, the DESIRED image section 12 shows another subarea of the acquired image of the image sequence as the ACTUAL image section 9. The selection of the DESIRED selection area 11 can be, for example, a relative shift of the DESIRED selection area 11 relative to the ACTUAL selection area 10 in the image coordinate system $P_x$, $P_y$. That is to say, the DESIRED selection area 11 is selected in the image coordinate system $P_x$, $P_y$ at a different position relative to the ACTUAL selection area 10, as illustrated in FIG. 2 and explained in greater detail in FIG. 4. Alternatively or in a supplementary fashion, the selection of the DESIRED selection area 11 can be a scaling, that is to say an enlargement or reduction, relative to the ACTUAL selection area 9, as illustrated in FIG. 3 and explained in more detail in FIG. 5. The shifting of the ACTUAL selection area 10 relative to the DESIRED selection area 11 enables the user to have various subareas of the image of the image sequence displayed. The scaling of the ACTUAL selection area 10 enables the user to have subareas of the image coordinate system $P_x$, $P_y$ displayed with different enlargement.

If the user selects the DESIRED selection area 11, the DESIRED image section 12 is to be transmitted to the client device 2 by the server 3 in order to display the DESIRED image section 12 on the screen 5. For this purpose, the position and/or scaling, selected by the user, of the DESIRED selection area 11 in the image coordinate system $P_x$, $P_y$ is acquired, for example, by the selection device 7 as a request, in particular as request data. Said request for the DESIRED image section 12 is output to the server 3. The latter evaluates the request and outputs the DESIRED image section 12 to the communication device 8 in common with metadata, for example as image coordinate points of the DESIRED image section. The DESIRED image section 12 is thereupon displayed on the screen 5 of the client device 2.

By way of example, the position and scaling of the DESIRED selection area 11 is acquired by means of image coordinate points. The acquisition of the position by means of image coordinate points is illustrated in FIG. 2, and the acquisition of the scaling by means of image coordinate points is illustrated in FIG. 3. The image coordinate points $P_{x\_min\_desired}$, $P_{x\_max\_desired}$, $P_{y\_min\_desired}$, and $P_{y\_max\_desired}$ designate, for example, the absolute position and/or absolute scaling of the DESIRED selection area 11. As an exemplary alternative, the relative shifting and/or relative scaling of the DESIRED selection area 11 relative to the ACTUAL selection area 10 is determined by means of the image coordinate points $P_{x\_min\_desired}$, $P_{x\_max\_desired}$, $P_{y\_min\_desired}$, $P_{y\_max\_desired}$ and $P_{x\_min\_actual}$, $P_{x\_max\_actual}$, $P_{y\_min\_actual}$, $P_{y\_max\_actual}$.

Figure 4:
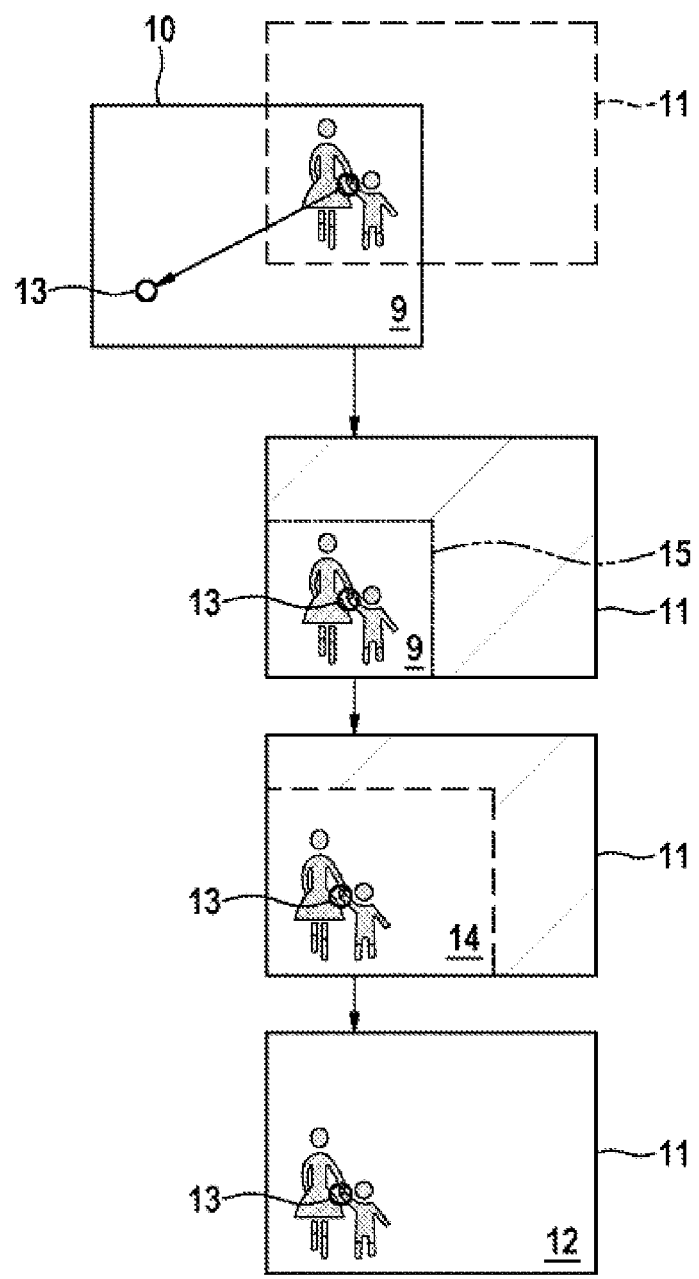
FIGS. 4 and 5 respectively show a schematic representation illustrating the mode of operation of the client device from FIG. 1.
Figure 5:
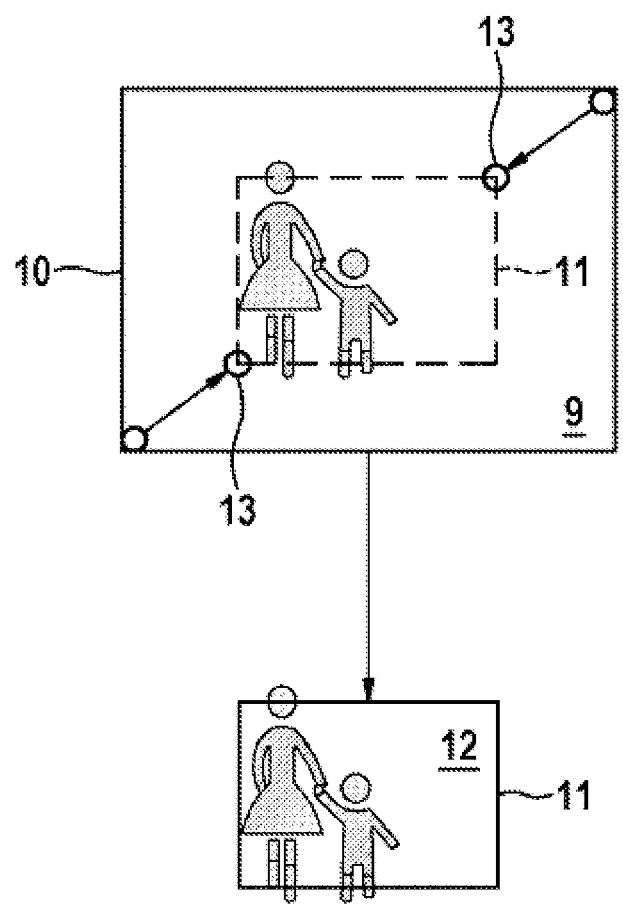

The mode of operation of the client device 2 in the selection of the DESIRED selection area 11 is to be described with the aid of FIGS. 4 and 5.

FIG. 4 shows the mode of operation for selecting a display, shifted on the screen 5, of a DESIRED selection area 11. Should the user wish to display another subarea of the image than the ACTUAL image section 9, the selection is performed, for example, via an interactive shifting of a selected pixel 13 in the ACTUAL image section 9. The DESIRED selection area 11 is therefore determined by the shifting of the pixel 13. Said first image display is displayed in the uppermost illustration of FIG. 4. Owing to the shifting of the pixel 13, it seems to the user that because of the relative shifting of the DESIRED image section 12 in relation to the ACTUAL image section 11 a subsection 15 on the screen 5 is displaced. However, as may be seen in FIG. 2, the subsection 15 is stationary in the image coordinate system $P_x$, $P_y$.

If the DESIRED selection area 11 is determined by the shifting of the pixel 13, in a second image display the ACTUAL image section 9 is displayed at least partially in the correct position and at the correct size in the DESIRED selection area 11. The second image display is shown in the second illustration in FIG. 4.

An intermediate image display follows after the second image display in this exemplary embodiment, an INTERMEDIATE image section 14 being displayed in the intermediate image display at least partially in the correct position and at the correct size in the DESIRED selection area 11. Such an intermediate image display can result from delay effects in conjunction with the request of the DESIRED image section 12. Thus, for example, it is possible that owing to a slow selection movement the INTERMEDIATE image section 14 is firstly requested, and only thereafter is the DESIRED image section 12 requested. In order to make good use of the transmitted image data of the INTERMEDIATE image section 14, said image data are displayed in the DESIRED selection area 11 in the correct position and at the correct size. The INTERMEDIATE image section 14 forms at least partially an image section which is updated and/or supplemented in relation to the ACTUAL image section 9. The ACTUAL image section 9 and the INTERMEDIATE image section 14 originate, for example, from different images of the image sequence. This situation is shown in the third illustration of FIG. 4.

In the further image display, the DESIRED image section 12 is displayed in the DESIRED selection area 11 in the correct position and at the correct size. The ACTUAL image section 9, the INTERMEDIATE image section 14 and the DESIRED image section 12 are respectively assigned an image of the image sequence. The further image display is shown in the fourth illustration of FIG. 4.

FIG. 5 shows the mode of operation of the scaled selection of a DESIRED selection area 11 with the DESIRED image section 12. In the case of this exemplary embodiment, the user selects an enlargement of the ACTUAL image section 9. The DESIRED selection area 11 is selected by an interactive shifting of two selected pixels of the ACTUAL image section 9, the ACTUAL image section 9 being scaled as a function of the position of the two selected pixels 13 in order to display the ACTUAL image section at least partially in the DESIRED image section 12. The subsection 15 is defined by the end of instruction from the user, that is to say by the final positioning of the pixels 13 in the ACTUAL image section 9.

Once the DESIRED selection area 11 is determined, in a second image display the ACTUAL image section 9 is displayed at least partially in the correct position and at the correct size in the DESIRED selection area 11, and in the further image display the DESIRED image section 12 is displayed in the correct position and at the correct size in the DESIRED selection area 11, the ACTUAL image section 9 and the DESIRED image section 12 originating from different images of the image sequence. The image coordinate points are preferably upscaled by the server 3 in the event of an enlargement of the ACTUAL image section 9, and downscaled in the event of a reduction in accordance with the image resolution of the client device 2, in order to attain an image display of the DESIRED image section 12 on the client device 2 which is optimal and as rapid as possible. It is also possible during a scaling to request an INTERMEDIATE image section 14 which is then displayed in the DESIRED selection area 11 in the correct position and at the correct size in the same way as in FIG. 4.

The invention claimed is:

1. A client device comprising:
   a screen configured to display an image sequence including a plurality of different images acquired by a monitoring camera,
   a control device electrically connected to the screen and configured to control displaying a first image display on the screen, the first image display showing an actual image section in an actual selection area from an image coordinate system, wherein the actual image section includes a subarea of an acquired image and the actual selection area defines the actual image section,
   a selection device configured to select a desired selection area from the image coordinate system, and
   a network communication device electrically connected to the control device and configured to request and receive a desired image section of the desired selection area from a server, wherein the desired selection area defines the desired image section,
   the control device configured to
      display a second image display on the screen, the second image display showing a subsection of the actual image section in a desired position and at a desired size in the desired selection area, and
      display a third image display on the screen, the third image display showing the desired image section in the desired position and at the desired size in the desired selection area,
   wherein the actual image section and the desired image section originate from different images of the image sequence,
   wherein the subsection of the actual image section forms at least one section of an overlapping area of the actual image section and the desired image section,
   wherein the control device is configured to display an intermediate image section at least partially in the desired position and at the desired size in the desired selection area in at least one intermediate image display prior to the third image display,
   wherein the selection device is configured to reposition the selection of the desired selection area by an interactive shift of two selected pixels of the actual image section, the actual image section being scaled as a function of the position of the two selected pixels in order to display the actual image section at least partially in the desired image section.

2. The client device as claimed in claim 1, wherein the position-desired and size-desired display of the desired image section is controlled in the desired selection area by means of metadata.

3. The client device as claimed in claim 2, wherein the metadata form image coordinate points of the image coordinate system.

4. The client device as claimed in claim 1, wherein the selection device is configured to reposition the selection of the desired selection area by an interactive shift of a selected pixel of the actual image section, the actual image section being shifted in common with the selected pixel in order to display the actual image section at least partially in the desired selection area.

5. The client device as claimed in claim 1, wherein the selection device is designed as a touchscreen.

6. The client device as claimed in claim 1, wherein the control device is one selected from the group consisting of a cell phone and a tablet.

7. The client device as claimed in claim 1, wherein the server is assigned to the monitoring camera.

8. The client device as claimed in claim 1, wherein the server is assigned to a plurality of monitoring cameras.

9. The client device as claimed in claim 1, wherein the image sequence is a stored video recording.

10. The client device as claimed in claim 1, wherein the image sequence is a real-time image of the monitoring camera.

11. The client device as claimed in claim 1, wherein the plurality of different images included in the image sequence are individual images as a continuous image sequence in a specific time interval of the image sequence.

12. The client device as claimed in claim 1, wherein the intermediate image section forms an image section which is updated in relation to the actual image section.

13. The client device as claimed in claim 1, wherein the actual image section, the desired image section, and the intermediate image section are respectively assigned to one of the plurality of different images of the image sequence.

14. A monitoring system comprising:
a client device having
a screen configured to display an image sequence including a plurality of different images acquired by a monitoring camera,
a control device electrically connected to the screen and configured to control displaying a first image display on the screen, the first image display showing an actual image section in an actual selection area from an image coordinate system, wherein the actual image section includes a subarea of an acquired image and the actual selection area defines the actual image section,
a selection device configured to select a desired selection area from the image coordinate system, and
a network communication device electrically connected to the control device and configured to request and receive a desired image section of the desired selection area, wherein the desired selection area defines the desired image section,
the control device configured to
display a second image display on the screen, the second image display showing a subsection of the actual image section in a desired position and at a desired size in the desired selection area, and
display a third image display on the screen, the third image display showing the desired image section in the desired position and at the desired size in the desired selection area,
wherein the actual image section and the desired image section originate from different images of the image sequence,
wherein the subsection of the actual image section forms at least one section of an overlapping area of the actual image section and the desired image section,
wherein the control device is configured to display an intermediate image section at least partially in the desired position and at the desired size in the desired selection area in the case of at least one intermediate image display prior to the third image display, and
wherein the selection device is configured to reposition the selection of the desired selection area by an interactive shift of two selected pixels of the actual image section, the actual image section being scaled as a function of the position of the two selected pixels in order to display the actual image section at least partially in the desired image section; and
a server storing the image sequence and configured to output the desired image section.

15. The monitoring system as claimed in claim 14, wherein the server is assigned to at least one monitoring camera, the image sequence acquired by the at least one monitoring camera being designed as a live picture.

16. A method for displaying images on a screen of a client device, the method comprising:
displaying, with an electronic processor, an actual image section in an actual selection area on the screen in a first image display, wherein the actual image section includes a subarea of an acquired image and the actual selection area defines the actual image section,
selecting, with a selection device, a desired selection area,
displaying, with the electronic processor, a subsection of the actual image section at least partially in a second image display,
displaying, with the electronic processor, a desired image section of the desired selection area in a desired position and at a desired size in the desired selection area in a third image display, wherein the desired selection area defines the desired image section,
displaying, with the electronic processor, an intermediate image section at least partially in the desired position and at the desired size in the desired selection area in at least one intermediate image display prior to the third image display, and
repositioning the selection of the desired selection area by an interactive shift of two selected pixels of the actual image section, the actual image section being scaled as a function of the position of the two selected pixels in order to display the actual image section at least partially in the desired image section,
wherein the actual image section and the desired image section originate from different images of an image sequence including a plurality of different images, wherein the image sequence is stored on a server,
wherein the subsection of the actual image section forms at least one section of an overlapping area of the actual image section and the desired image section.

17. The method as claimed in claim 16, further comprising:
transmitting a request to the server, the request including data relating to the desired selection area; and
receiving the desired image section of the desired selection area from the server in response to the request.

18. The method as claimed in claim 17, wherein receiving the desired image section of the desired selection area includes receiving image coordinate points of the desired image section, the image coordinate points representing a position of the desired image section in the image coordinate system.

19. A non-transitory machine-readable storage medium having a computer program stored thereon having program code, when the program code is executed on a computer, to carry out the following steps:
display a first image display on a screen, the first image display showing an actual image section in an actual selection area, wherein the actual image section includes a subarea of an acquired image and the actual selection area defines the actual image section, select a desired selection area, display a second image display on the screen, the second image display showing a subsection of the actual image section at least partially in a desired position and at a desired size in the desired selection area, display a third image display on the screen, the third image display showing a desired image section of the desired selection area in the desired position and at the desired size in the desired selection area, wherein the desired selection area defines the desired image section, display an intermediate image section at least partially in the desired position and at the desired size in the desired selection area in at least one intermediate image display prior to the third image display, and repositioning the selection of the desired selection area by an interactive shift of two selected pixels of the actual image section, the actual image section being scaled as a function of the position of the two selected pixels in order to display the actual image section at least partially in the desired image section, wherein the actual image section and the desired image section originate from different images of an image sequence including a plurality of different images, the image sequence stored on a server, wherein the subsection of the actual image section forms at least one section of an overlapping area of the actual image section and the desired image section.

* * * * *